March 20, 1951 L. LEE 2,545,853
HYDRAULIC DUST TRAP
Filed April 17, 1947 3 Sheets-Sheet 1

Inventor:
Leonard Lee
by Pennie, Edmonds, Morton and Barrows
Attorneys

March 20, 1951 L. LEE 2,545,853
HYDRAULIC DUST TRAP
Filed April 17, 1947 3 Sheets-Sheet 2
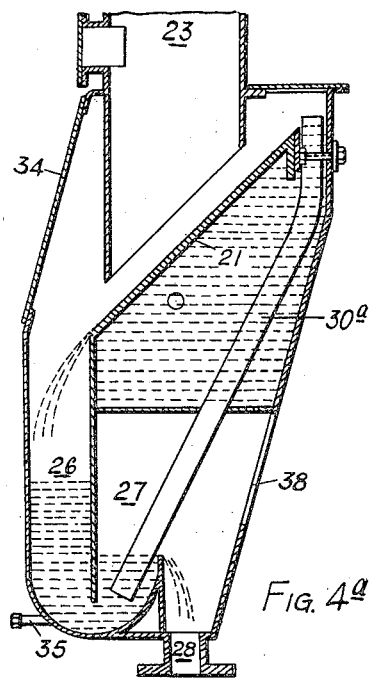
FIG. 4ᵃ
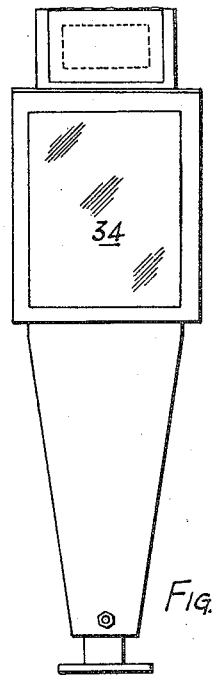
FIG. 4ᵇ
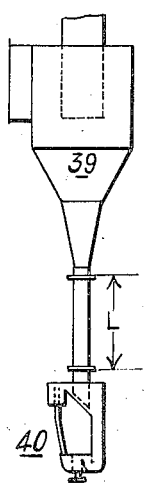
FIG. 6
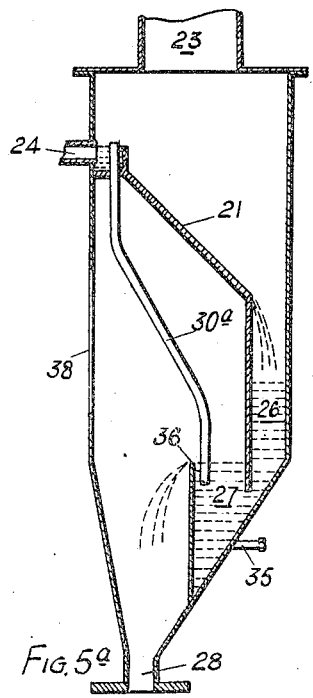
FIG. 5ᵃ
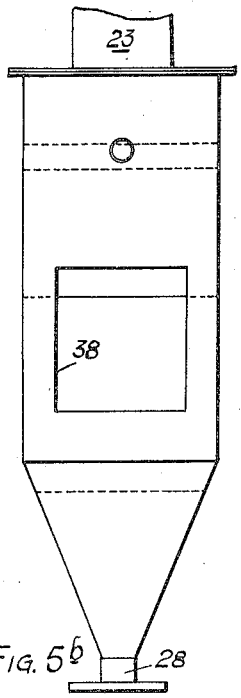
FIG. 5ᵇ
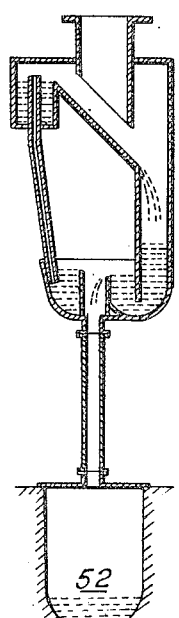
FIG. 9
Inventor:
Leonard Lee
by
Pennie, Edmonds, Morton and Barrows
Attorneys March 20, 1951 L. LEE 2,545,853
HYDRAULIC DUST TRAP Filed April 17, 1947 3 Sheets-Sheet 3

Inventor:
Leonard Lee
by
Pennie, Edmonds, Morton and Barrows
Attorneys

Patented Mar. 20, 1951

2,545,853

UNITED STATES PATENT OFFICE 2,545,853

HYDRAULIC DUST TRAP

Leonard Lee, Glasgow, Scotland, assignor to James Howden & Company Limited, Glasgow, Scotland, a company of Great Britain Application April 17, 1947, Serial No. 742,187
In Great Britain May 13, 1946

5 Claims. (Cl. 302—15)

The subject of this invention is a hydraulic dust trap.

A dust trap according to the invention includes a casing structure affording an inlet for dust and an outlet for liquid and entrained dust, and a clean liquid chamber, a weir, and an inclined surface, located within said casing structure.

One practical construction according to the invention adapted to work under sealed conditions includes also a liquid sealing chamber, and a downcomer dust inlet arranged to admit dust downwardly onto the inclined surface.

The clean liquid chamber has a valved inlet connection for clean liquid and an adjustable weir plate over which liquid flows onto the inclined surface, the liquid film being discharged from the lower end of the inclined surface into a sealing chamber within the casing structure.

The sealing chamber may include a first leg which receives the liquid film, and a second leg which is open to atmosphere and discharges into the liquid and dust outlet.

An emergency overflow seal pipe may extend from the clean liquid chamber to a liquid seal within the casing structure.

An auxiliary liquid supply inlet valve connection may be provided on the base of the sealing chamber, for intermittent agitation of the deposited dust particles when required.

Figures 1A, 1B, 1C:
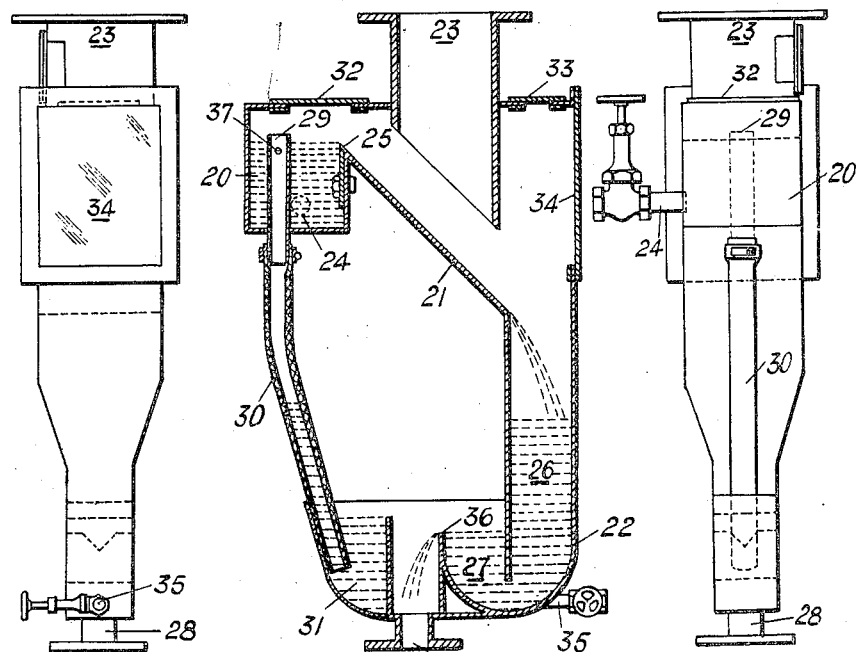
Figure 2:
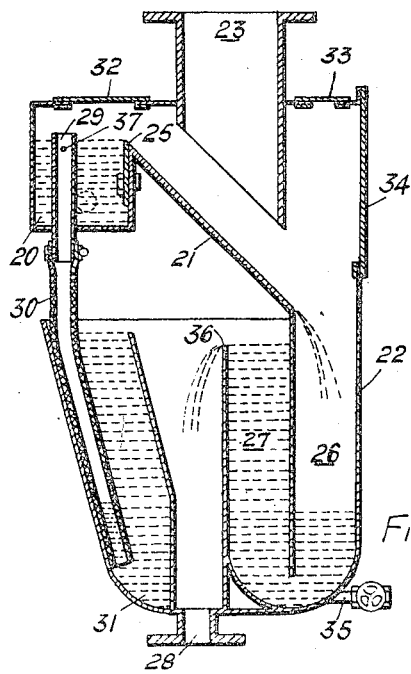
Figure 3:
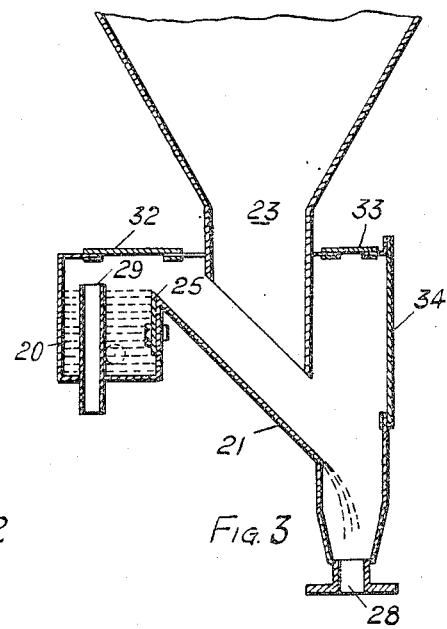
Figure 7:
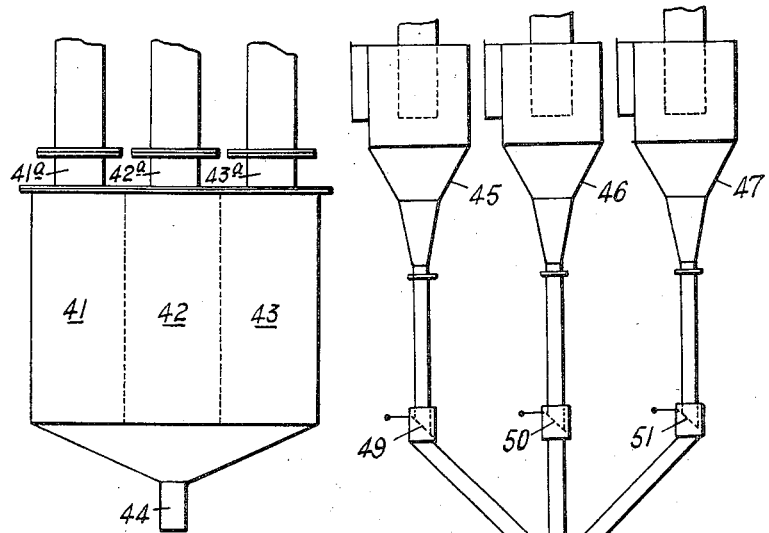
Figure 8:
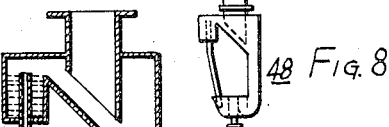
Figure 10:
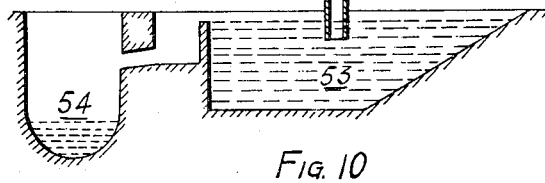

Several dust trap constructions according to the invention are illustrated in the accompanying drawings. Figs. 1ª, 1ᵇ, and 1ᶜ are a vertical section and elevations at right angles to Fig. 1ª respectively, showing a basic construction of dust trap suitable for working in a plant operating under suction. Fig. 2 is a vertical section of a modified dust trap suitable for application to a system operating under pressure. As will be understood, differences in pressure can be taken care of by making the sealing leg of the trap of proportionate length. The trap shown in Figs. 1ª, 1ᵇ and 1ᶜ will operate also at atmospheric pressure. Fig. 3 is a vertical section showing a simplified version of the Fig. 1ª construction, adapted for atmospheric working. Figs. 4ª and 4ᵇ are a vertical section and an elevation at right angles to Fig. 4ª, respectively, showing a modification of the basic construction of Figs. 1ª, 1ᵇ and 1ᶜ. Figs. 5ª and 5ᵇ are views corresponding to Figs. 4ª and 4ᵇ showing a further modification. Fig. 6 is a diagrammatic elevation showing the application of a dust trap to a single dust collector. Fig. 7 is an elevation showing a multiple construction of trap adapted to receive dust from a plurality of collectors. Fig. 8 is an elevation showing a single dust trap serving a group of collectors. Fig. 9 is a vertical section showing one method of disposing of the slurry discharge from a dust trap. Fig. 10 is a vertical section showing an alternative method of disposing the slurry discharge.

Referring to Figs. 1ª, 1ᵇ, and 1ᶜ of the drawings, the hydraulic dust trap shown includes a closed casing structure incorporating a chamber 20 into which clean water is introduced, an inclined plate 21, a sealing chamber 22, and a downcomer dust inlet 23 arranged to admit dust downwardly onto the plate 21.

The inclination of the plate 21 is such as to cause the water film to flow fairly rapidly down the plate.

The chamber 20 has a valved clean water inlet connection 24 and an adjustable weir plate 25 over which water flows onto the plate 21, the water film being discharged from the lower end of the film plate into the sealing chamber 22.

The sealing chamber 22 includes a long leg 26 which receives the water film, and a short leg 27 which is open to atmosphere and discharges into an outlet 28 dust and water.

An emergency overflow pipe 29 within the chamber 20 is connected by a flexible external pipe 30 with a water seal 31 arranged to overflow into the outlet 28.

Removable windows 32, 33 and 34 are fitted to the casing.

An auxiliary water supply inlet valve connection 35 may be provided on the base of the sealing chamber 22, for intermittent agitation of the dust particles when required.

In operation, water fed into the chamber 20 rises to the weir level where it attains a constant level which is unaffected by suction in the trap. The water flows over the plate 21, collecting falling dust from the dust inlet 23 and flows over the lower end of the plate into the long sealing leg 26. The water level in the leg 26 rises according to the suction in the trap. The water and dust then flow through the bottom of the long leg into the short leg 27 and over a secondary weir 36 to the outlet 28.

The auxiliary clean water supply 35, which has the action of a jet to promote turbulence at the bottom of the seal, is only used when the dust has a tendency to accumulate, as, for example, when the dust contains a fairly large proportion of large particles.

The overflow pipe 29 has its open upper end just above weir level in the chamber 20 and there is drilled in the pipe 29, just below weir level, a small hole 37 through which passes a continuous trickle of water which maintains the water seal 31.

In the pressure-working modification shown in Fig. 2 all of the water seals are deeper, the seals 26, 27 being the short and the long seals, respectively, in this case.

In the modification shown in Fig. 3, the seals 26 and 27 are dispensed with.

In the modification shown in Figs. 4a and 4b the pipe 30a is enclosed within the casing structure. 38 denotes an inspection hole in the casing.

The modification shown in Figs. 5a, 5b is self-explanatory.

In Fig. 6 the dust collector is indicated at 39 and the dust trap at 40. The length L of the discharge pipe from the collector to the dust trap can be varied to suit the plant arrangement.

In Fig. 7 there are three dust traps 41, 42 and 43 built as a unit and having individual dust inlets 41a, 42a and 43a, respectively, and a common outlet 44.

In the construction shown in Fig. 8 there are three collectors 45, 46, 47 connected to a common dust trap 48 by way of ducts fitted with individual automatic dust valves 49, 50, 51, respectively.

In the arrangement according to Fig. 9 the dust and water slurry from a dust trap is discharged directly into a sluice 52. Alternatively, and as shown in Fig. 10, the slurry is led into a settling pit or tank 53, the clear water passing into a drain 54.

As will be understood, the dust trap may be fabricated or cast in any ferrous or non-ferrous metal, and may be of welded or bolted construction. The trap may also be constructed of wood or of concrete.

To protect a metallic trap against corrosion the trap may be galvanised or otherwise protectively treated.

What is claimed is:

1. A hydraulic dust trap for disposal of dust caught in a dry dust collector, comprising a casing structure having in its upper region separate inlets for dust and clean liquid and in its lower region an outlet for liquid and entrained dust, a clean liquid chamber disposed in the upper region of said casing structure and open to the inlet for clean liquid, a weir plate forming one wall of said chamber, and a stationary inclined plate having a surface extending downwardly within said casing structure from said weir plate and directly beneath the inlet for dust whereby liquid overflowing continuously from said clean liquid chamber, without splashing, over said weir plate and down said inclined plate in the form of a smooth film collects dust from the dust outlet for discharge through said outlet.

2. A hydraulic dust trap for disposal of dust caught in a dry dust collector comprising a casing structure having in its upper region separate inlets for dust and clean liquid and in its lower region an outlet for liquid and entrained dust, a clean liquid chamber disposed in the upper region of said casing structure and open to the inlet for clean liquid, a weir plate forming one wall of said chamber, a sealing chamber disposed in the lower region of said casing structure and discharging into said outlet, and a stationary inclined plate having a surface extending downwardly within said casing structure from said weir plate and directly beneath the inlet for dust to said casing structure.

3. A hydraulic dust trap for disposal of dust caught in a dry dust collector, comprising a casing structure, a wall having a downwardly inclined plane surface in the casing structure, means including a conduit for supplying clean liquid to the casing structure and for distributing such liquid substantially uniformly across the upper portion of said inclined plane surface, an outlet for liquid and entrained dust in the lower portion of the casing structure, and an inlet duct for supplying dust to said casing structure, said duct having an outlet port directly over said inclined plane surface, whereby dust conducted into said casing structure through said duct is collected by liquid flowing from said liquid supply means downwardly over said inclined plane surface.

4. A hydraulic dust trap as claimed in claim 3 in which said clean liquid supplying means comprises a chamber for clean liquid at the upper portion of said inclined plane surface, said chamber having a horizontal overflow edge substantially coincident with the upper portion of said inclined plane surface.

5. A hydraulic dust trap as claimed in claim 3 characterized in that the outlet port of the dust supply duct is adjacent to but spaced from the inclined plane surface in the casing structure.

LEONARD LEE.

REFERENCES CITED

The following references are of record in the file of this patent:

UNITED STATES PATENTS

| Number | Name | Date |
|---|---|---|
| 1,864,009 | Allen | June 21, 1932 |
| 2,366,763 | Wieland | Jan. 9, 1945 |
| 2,370,207 | Thorsten | Feb. 27, 1945 |